US012802477B2

(12) United States Patent
Daher et al.

(10) Patent No.: US 12,802,477 B2
(45) Date of Patent: Nov. 17, 2026

(54) AUTOMATED ZONING AND RECOGNITION OF CHARACTERS IN A DIGITAL DOCUMENT

(71) Applicant: Apryse Software Corp., Denver, CO (US)

(72) Inventors: Mohammad Daher, Charlotte, NC (US); Khalil El Dana, Charlotte, NC (US); Bashar Tarabieh, Amman (JO)

(73) Assignee: Apryse Software Corp., Denver, CO (US)

( * ) Notice: Subject to any disclaimer, the term of this patent is extended or adjusted under 35 U.S.C. 154(b) by 259 days.

(21) Appl. No.: 18/907,173

(22) Filed: Oct. 4, 2024

(65) Prior Publication Data

US 2025/0118098 A1 Apr. 10, 2025

Related U.S. Application Data

(60) Provisional application No. 63/588,519, filed on Oct. 6, 2023.

(51) Int. Cl.
*G06V 30/148* (2022.01)
*G06V 30/413* (2022.01)
*G06V 30/414* (2022.01)

(52) U.S. Cl.
CPC .......... *G06V 30/158* (2022.01); *G06V 30/413* (2022.01); *G06V 30/414* (2022.01)

(58) Field of Classification Search
CPC .. G06V 30/158; G06V 30/413; G06V 30/414; G06V 30/10
See application file for complete search history.

(56) References Cited

U.S. PATENT DOCUMENTS 7,602,972 B1 * 10/2009 Wei .................... G06F 40/177 382/175
8,290,268 B2 * 10/2012 Jain .................... G06V 30/414 382/175
9,223,756 B2 * 12/2015 Agrawal ................ G06F 40/10
10,970,458 B1 * 4/2021 Dhanuka .............. G06V 30/416
2008/0317337 A1 * 12/2008 Wang .................. G06V 30/416 382/165

(Continued)

OTHER PUBLICATIONS

Viktorovich, Arlazarov Vladimir, et al. "Document image analysis and recognition: a survey." Компьютерная оптика 46.4 (2022): 567-589. (Year: 2022).*

*Primary Examiner* — Utpal D Shah
(74) *Attorney, Agent, or Firm* — Oblon, McClelland, Maier & Neustadt, L.L.P.

(57) ABSTRACT

A method for identifying zones of text in a digital document, including identifying one or more vertical chains of nodes, classifying horizontal spaces between horizontally aligned text objects in the digital document, combining one or more text objects into a segmented horizontal line based on the one or more vertical chains and the classification of horizontal spaces between the one or more text objects, identifying one or more intermediate vertical chains of nodes, refining the segmented horizontal line based on the one or more intermediate vertical chains, and identifying a zone of text based on the one or more vertical chains of nodes and the segmented horizontal line.

20 Claims, 7 Drawing Sheets

(56) References Cited

U.S. PATENT DOCUMENTS

| | | | | |
|---|---|---|---|---|
| 2012/0045129 | A1* | 2/2012 | Sun | G06V 30/1478 382/176 |
| 2014/0270526 | A1* | 9/2014 | Wu | G06V 10/763 382/177 |
| 2020/0050845 | A1* | 2/2020 | Foncubierta Rodriguez | G06V 30/412 |
| 2020/0364452 | A1* | 11/2020 | Pellinen | G06F 40/216 |
| 2021/0383106 | A1* | 12/2021 | Maggio | G06F 40/279 |
| 2023/0051051 | A1* | 2/2023 | Daher | G06V 10/82 |
| 2025/0322148 | A1* | 10/2025 | Yanchina | G06F 40/174 |

* cited by examiner personal interests," he claimed.

In a telephone call, GFJTU President Mazen Maayteh said the case is now at the attorney general's office.

The ACC charged that there is evidence that might indicate corruption, but the case is still to be examined by the court," he said, adding that there was no corruption and at its worst, "it is only a matter of management mishaps".

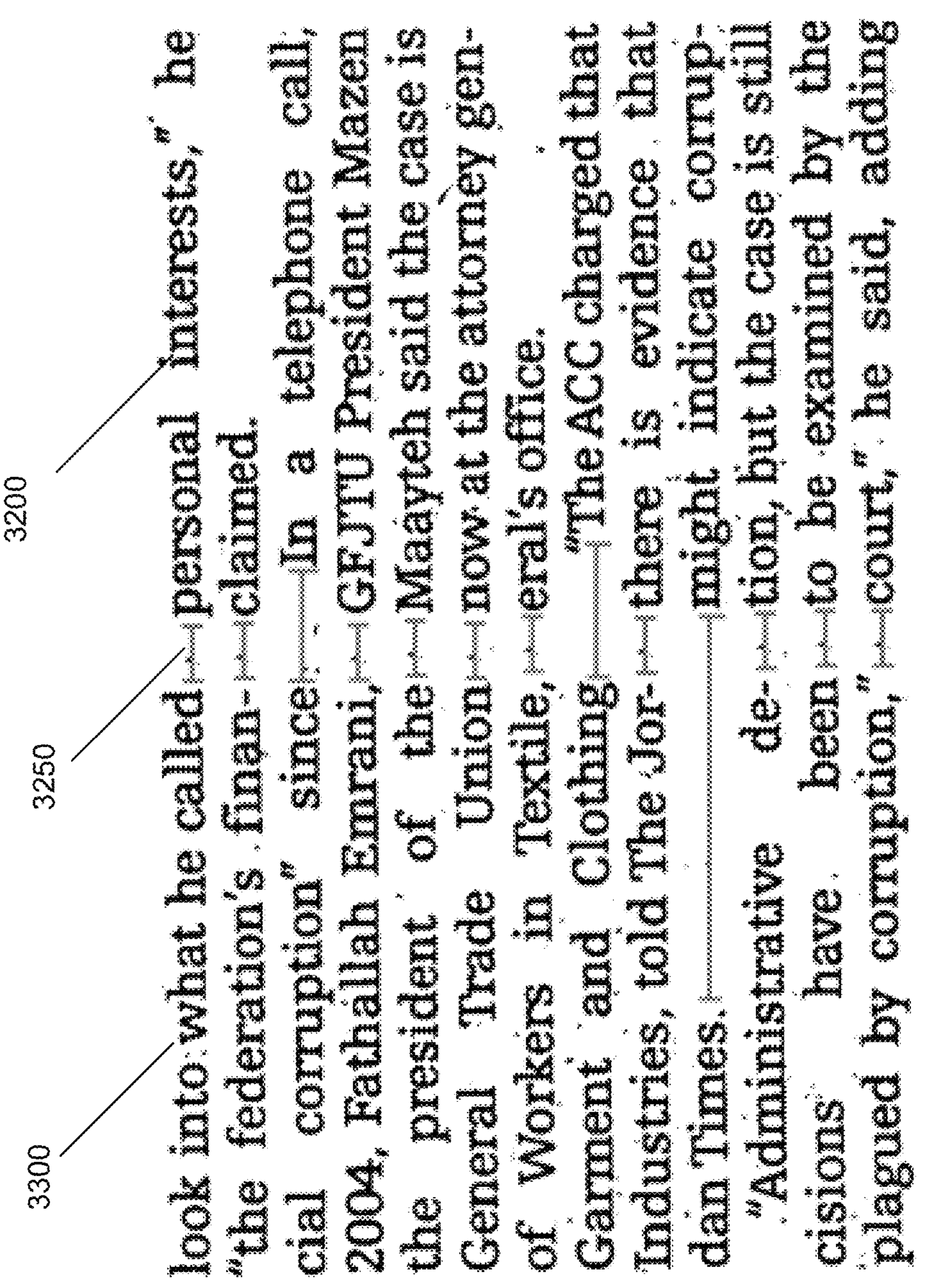
look into what he called personal interests," he claimed.

"the federation's financial corruption" since 2004, Fathallah Emrani, the president of the General Trade Union of Workers in Textile, Garment and Clothing Industries, told The Jordan Times.

"Administrative decisions have been plagued by corruption,"

In a telephone call, GFJTU President Mazen Maayteh said the case is now at the attorney general's office.

"The ACC charged that there is evidence that might indicate corruption, but the case is still to be examined by the court," he said, adding

FIG. 3B

AUTOMATED ZONING AND RECOGNITION OF CHARACTERS IN A DIGITAL DOCUMENT

CROSS-REFERENCE TO RELATED APPLICATION(S)

The present application claims priority to U.S. Provisional Application No. 63/588,519, filed Oct. 6, 2023, the entire content of which is incorporated herein by reference in its entirety for all purposes.

BACKGROUND

Field of the Disclosure

The present disclosure relates generally to the field of character recognition.

Description of the Related Art

Document zoning is an important preprocessing step for optical character recognition (OCR). Accurate zoning of text can influence OCR quality, especially for documents with inconsistent or irregular text formatting and layout.

The foregoing "Background" description is for the purpose of generally presenting the context of the disclosure. Work of the inventors, to the extent it is described in this background section, as well as aspects of the description which can not otherwise qualify as prior art at the time of filing, are neither expressly or impliedly admitted as prior art against the present disclosure.

SUMMARY

In one embodiment, the present disclosure is related to a method for identifying zones of text in a digital document, comprising identifying, via processing circuitry, one or more vertical chains of nodes in the digital document, each node of each vertical chain corresponding to a leftmost text object of a horizontal line of text in the digital document; classifying, via the processing circuitry, horizontal spaces between horizontally aligned text objects in the digital document; combining, via the processing circuitry, one or more text objects into a segmented horizontal line based on the one or more vertical chains and the classification of horizontal spaces between the one or more text objects; identifying, via the processing circuitry, one or more intermediate vertical chains of nodes in the digital document, each node of each intermediate vertical chain corresponding to a text object of a segmented horizontal line; refining, via the processing circuitry, the segmented horizontal line based on the one or more intermediate vertical chains; and identifying, via the processing circuitry, a zone of text based on the one or more vertical chains of nodes and the segmented horizontal line.

In one embodiment, the present disclosure is related to a device comprising processing circuitry configured to identify one or more vertical chains of nodes in a digital document, each node of each vertical chain corresponding to a leftmost text object of a horizontal line of text in the digital document, classify horizontal spaces between horizontally aligned text objects in the digital document, combine one or more text objects into a segmented horizontal line based on the one or more vertical chains and the classification of horizontal spaces between the one or more text objects, identify one or more intermediate vertical chains of nodes in the digital document, each node of each intermediate vertical chain corresponding to a text object of a segmented horizontal line, refine the segmented horizontal line based on the one or more intermediate vertical chains, and identify a zone of text based on the one or more vertical chains of nodes and the segmented horizontal line.

In one embodiment, the present disclosure is related to a non-transitory computer-readable storage medium for storing computer-readable instructions that, when executed by a computer, cause the computer to perform a method, the method comprising identifying one or more vertical chains of nodes in a digital document, each node of each vertical chain corresponding to a leftmost text object of a horizontal line of text in the digital document; classifying horizontal spaces between horizontally aligned text objects in the digital document; combining one or more text objects into a segmented horizontal line based on the one or more vertical chains and the classification of horizontal spaces between the one or more text objects; identifying one or more intermediate vertical chains of nodes in the digital document, each node of each intermediate vertical chain corresponding to a text object of a segmented horizontal line;

refining the segmented horizontal line based on the one or more intermediate vertical chains; and identifying a zone of text based on the one or more vertical chains of nodes and the segmented horizontal line.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3B illustrates a left-side vertical chain of nodes, according to an embodiment of the present disclosure;

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics can be combined in any suitable manner in one or more embodiments without limitation.

Identifying zones of text in a digital document is an important step for OCR. There are many instances where two units of text (e.g., two words, two lines, two sections of text) are visually adjacent but are not related to each other and should be parsed independently by an OCR algorithm. For example, text can be arranged in two or more columns. A line of text in a first column can be horizontally aligned with (on the same horizontal axis as) a line of text in a second column adjacent to the first column. Thus, the lines of text may be mistaken as being a single line of text that can be read across the first column and the second column. However, the line of text in the second column is not a continuation of the line of text in the first column. Text in the first column is not linked to text in the second column. Accurate OCR depends on being able to identify text in the first column as being separate from text in the second column and grouping text within the first column as a first zone of text and text within the second column as a second zone of text. Challenges in separating and grouping text into zones can arise as a result of a wide variety of font and formatting specifications, spacing, typing styles, etc. in a digital document.

In one embodiment, the present disclosure can be directed towards systems and methods for identifying zones of text in a digital document. A zone of text can refer to a grouping of characters sharing at least one vertical boundary. In one embodiment, the at least one vertical boundary can be defined by a mathematical equation or mapping. A zone of text can include one or more lines of text in a sequence. For example, a first zone of text can be a paragraph of text in a first column. A second zone of text can be a paragraph of text in a second column adjacent to the first column.

Figure 1:
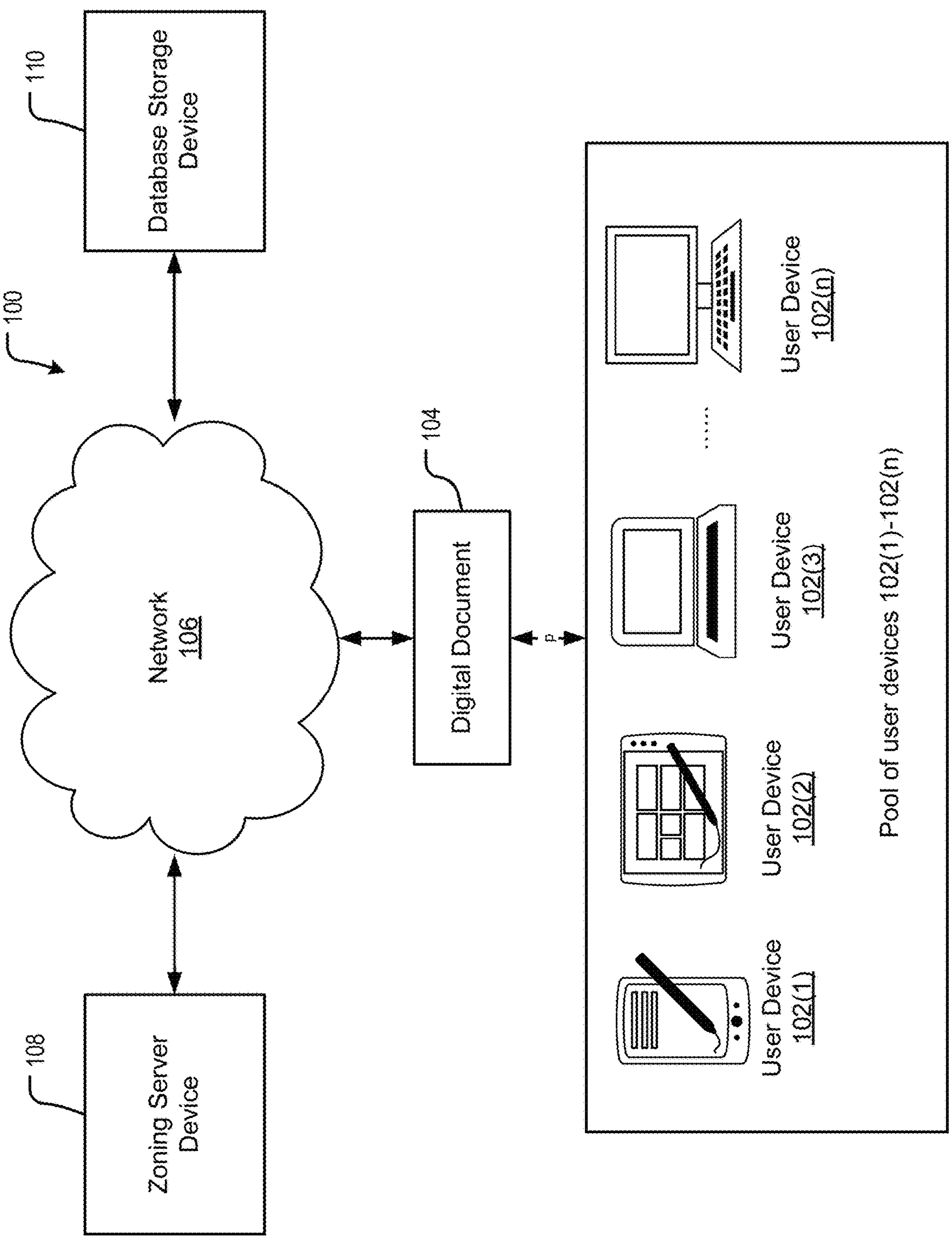
FIG. 1 is a block diagram of a character recognition system according to an embodiment of the present disclosure.

FIG. 1 is a block diagram of a text zoning system 100 according to an embodiment of the present disclosure. The text zoning system 100 can be used to implement the methods for identifying zones of text, as described herein. The text zoning system 100 can include user devices 102(1)-102(*n*), a digital document 104, network 106, a zoning server device 108, and a database storage device 110. User devices 102(1)-102(*n*) can also be referred to as pool of user devices 102(1)-102(*n*). Components of system 100 can include computing devices (e.g., computer(s), server(s), etc.) with processing circuitry, memory storing data, and/or software instructions (e.g., server code, client code, databases, etc.), as is described in further detail with reference to FIG. 5 and FIG. 6. In some embodiments, the one or more computing devices can be configured to execute software instructions stored on one or more memory devices via processing circuitry in order to perform one or more methods consistent with the disclosed embodiments.

User devices 102(1)-102(*n*) can be a tablet computer device, a mobile phone, a laptop computer device, and/or a personal computer device, although any other user communication device can also be included. In certain embodiments, user devices 102(1)-102(*n*) can include a smartphone. However, the skilled artisan will appreciate that the features described herein can be adapted to be implemented on other devices (e.g., a server, an e-reader, a camera, a navigation device, etc.)

Digital document 104 can be a digital version of any document that can be stored or displayed on user devices 102(1)-102(*n*). Digital document 104 can be in any format such as a Portable Document Format (PDF), an image file such as a Joint Photographic Experts Group (JPEG) file format, a word processing document such as those commonly used in Microsoft Word (.doc, .docx), or other digital formats known to a person skilled in the art. Further, digital document 104 can be a digital version of a physical document that can be captured and converted into a digitized document by user devices 102(1)-102(*n*). In one example, a digital document 104 can be an image of a physical document such as a newspaper or magazine.

User devices 102(1)-102(*n*) can include a scanner, a fax machine, a camera or other similar devices that are utilized to convert a physical document to generate a digital document 104. It can be appreciated by a person skilled in the art that the present disclosure is not limited to any particular device utilized to generate digital document 104. Digital document 104 can include any artifact having textual content. Digital document 104 can include printed text, handwritten text, graphics, barcodes, QR codes, lines, images, shapes, color, structures, format, layout, or other identifiers, and/or images thereof. Digital document 104 can be a form with input fields that can be filled by a user, a personal identification document that can include text, images or other identifiers, a letter, a note, or the like.

Network 106 can comprise one or more types of computer networking arrangements configured to provide communications or exchange data, or both, between components of system 100. For example, network 106 can include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that can enable information exchange among various components of system 100. Network 106 can also include a public switched telephone network ("PSTN") and/or a wireless cellular network. Network 106 can be a secured network or unsecured network. In some embodiments, one or more components of system 100 can communicate directly through a dedicated communication link(s). User devices 102(1)-102(*n*), zoning server device 108, and database storage device 110 can be configured to communicate with each other over network 106.

Zoning server device 108 can be one or more network-accessible computing devices configured to perform one or more operations consistent with the disclosed embodiments, as described more fully below. As discussed below, zoning server device 108 can be a network device that stores instructions for identifying zones of text within digital document 104.

Database storage device 110 can be communicatively coupled, directly or indirectly, to zoning server device 108 and user devices 102(1)-102(*n*) via network 106. Database storage device 110 can also be part of zoning server device 108 (i.e., not separate devices). Database storage device 110 can include one or more memory devices that store information and are accessed and/or managed by one or more components of system 100. By way of example, database storage device 110 can include Oracle™ databases, Sybase™ databases, or other relational databases or non-relational databases, such as Hadoop sequence files, HBase, or Cassandra. Database storage device 110 can include computing components (e.g., database operating system, network interface, etc.) configured to receive and process requests for data stored in memory devices of database storage device 110 and to provide data from database storage device 110. Database storage device 110 can be configured to store instructions for identifying zones of text within digital document 104.

Figure 2:
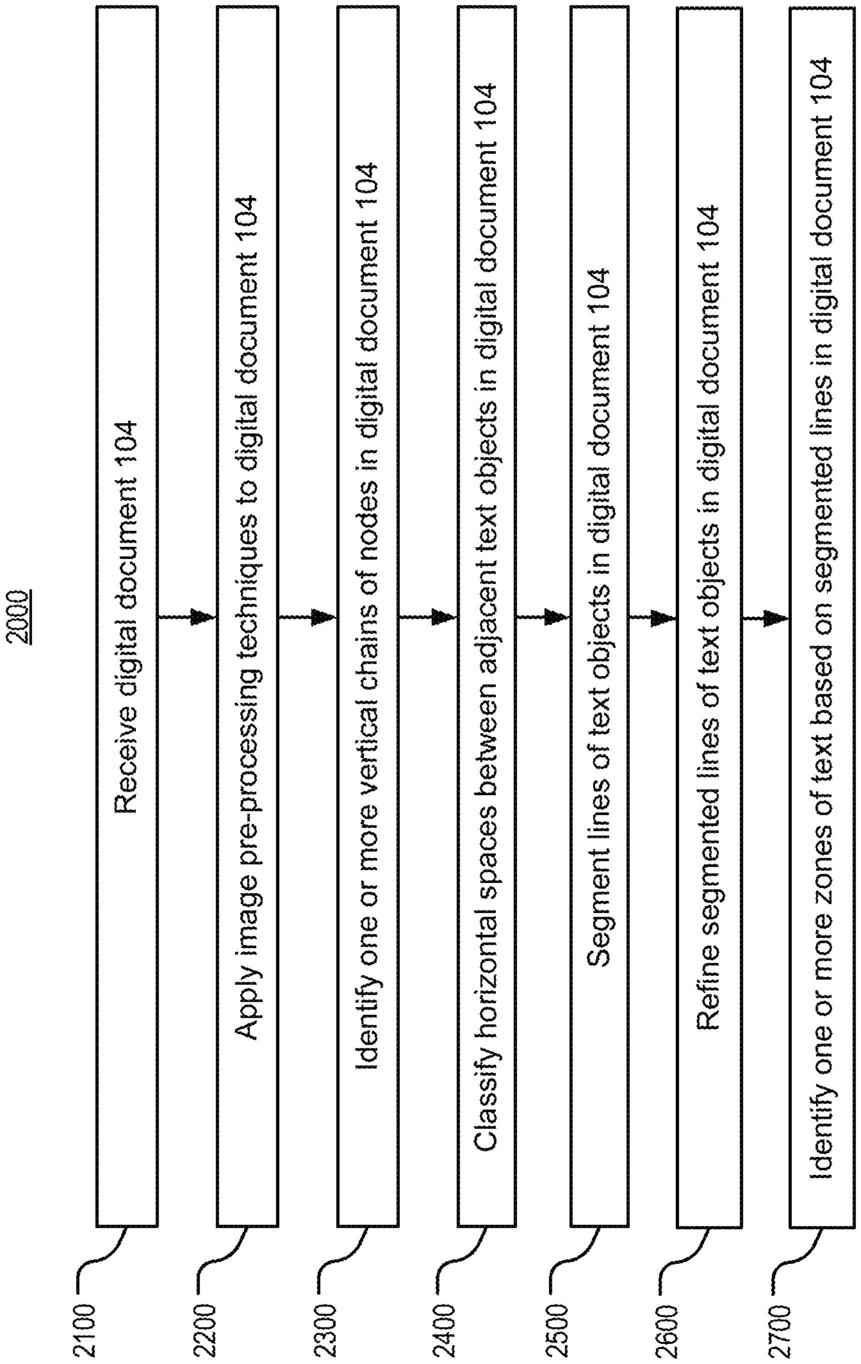
FIG. 2 is a flow chart illustrating a text zoning method according to an embodiment of the present disclosure.

FIG. 2 is a flow chart of a method 2000 for identifying zones of text objects in a digital document 104, according to one embodiment of the present disclosure. The method 2000 can be executed by the zoning server device 108 using processing circuitry. The processing circuitry can include any of the components described in reference to FIG. 5 and FIG. 6, including a central processing unit (CPU) 700. The text objects can include characters, letters, numbers, symbols, etc. A text object, as used herein, can refer to a character, letter, number, symbol, etc. that can be manipulated or distorted into a modified state. For example, a text object can be a letter that is rotated by a number of degrees to a modified state or flipped over a vertical or horizontal axis to a modified state. The methods described herein can be applied to text objects that may or may not be recognizable by OCR algorithms.

In one embodiment, the zoning server device 108 can group text objects into a number of units while executing the method 2000, the units including, but not limited to, a single character such as a letter or a number, a sequence, a word, a sentence, a paragraph, etc. A unit may or may not correspond to a morpheme, or any meaningful unit of language. For example, text objects can be grouped into a sequence that do not form a word or have any meaning. In one embodiment, a grouping of text objects can be defined based on spacing between text objects within the grouping and spacing between groupings.

In one embodiment, the method 2000 can begin when a digital document 104 is received by zoning server device 108 at step 2100. In one embodiment, the zoning server device 108 can receive the digital document 104 from a user device 102(1) of a plurality of user devices 102(1)-102(*n*). User devices 102(1)-102(*n*) can be scanners, fax machines, cameras or other similar devices. In an embodiment, digital document 104 can be generated by user device 102(1) by converting a physical document (e.g., a page including handwritten text, printed text, and/or graphics) into digital document 104 or by creating digital document 104 in any format such as pdf, image, word, or other digital formats known to a person skilled in the art. Each of the following steps of the method 2000 will be described in further detail herein.

At step 2200, the zoning server device 108 can apply image pre-processing techniques to modify the digital document 104 in order to improve the quality of zone identification. The image pre-processing techniques can include, but are not limited to, de-skewing images in the digital document 104, removing line segments, and separating merged text objects.

At step 2300, the zoning server device 108 can identify one or more vertical chains of nodes in the digital document 104. The nodes in a vertical chain can correspond to text objects, such as characters or letters, having a shared alignment or property. The vertical chain of nodes can be identified based on one or more vertical chain criteria. The vertical chain of nodes can be used to determine the boundaries of a zone of text.

At step 2400, the zoning server device 108 can identify and classify horizontal spaces between adjacent text objects and/or groups of text objects. A horizontal space between neighboring text objects can be classified based on an absolute or a relative size of the space. The classification of horizontal spaces can be used to determine whether adjacent text objects are within the same zone. For example, a horizontal space between a first text object and a second text object that is wider than a set threshold can indicate that the first text object and the second text object are in separate columns. The first text object and the second text object will therefore be grouped into separate zones.

At step 2500, the zoning server device 108 can segment lines of text objects based on the horizontal spacing between text objects. A line of text objects can refer to a series of text objects that are horizontally aligned along the same horizontal axis. A segmented line of text objects can refer to a portion of a line of text objects that is separated from a remainder of the line according to one or more vertical alignment criteria, spacing criteria, or other criteria described herein. In one embodiment, a segmented line of text objects can be an entire line.

In one example, a digital document can include two adjacent columns of text, the columns being separated by a column break. The first column can include text objects that are horizontally aligned with text objects in the second column, thus forming a line of text objects that spans across the first column and the second column. However, the text objects in the first column should be segmented from the text objects in the second column. The zoning server device 108 can identify a first segmented line of text objects in the first column and a second segmented line of text objects in the second column according to the criteria of step 2500.

At step 2600, the zoning server device 108 can refine each segmented line of text objects identified in step 2500 by identifying and characterizing surrounding lines of text objects in a vertical direction. For example, when refining a segmented line of interest, the zoning server device 108 can identify one or more upper (preceding) lines above the segmented line of interest and one or more lower (succeeding) lines below the segmented line of interest. Characterizing the surrounding lines can include determining a relationship between a segmented line of interest and the surrounding lines. In one embodiment, the zoning server device 108 can identify intermediate vertical chains of nodes spanning across a segmented line and the surrounding lines. Refining a segmented line of interest can include modifying or adjusting the text objects that are included in the segmented line based on the surrounding lines. For example, the zoning server device 108 can join two segmented lines of text objects into a single segmented line based on the characterization of surrounding lines.

In one embodiment, the zoning server device 108 can repeat step 2600 to iteratively refine each segmented line of text objects. For example, the zoning server device 108 can join two segmented lines of text objects into a combined segmented line in a first execution of step 2600. The combined segmented line can have different characteristics or a different relationship with surrounding lines than the original two separate segmented lines. The zoning server device 108 can execute step 2600 a second time, using the combined segmented line from the first execution to continue refining each line. In one embodiment, the zoning server device 108 can repeat step 2600 for a predetermined number of iterations. In one example, the zoning server device 108 can execute step 2600 four times.

At step 2700, the zoning server device 108 can identify one or more zones of text based on the segmented lines of text objects identified in step 2600. A zone of text can include one or more segmented lines of text objects. In one embodiment, a zone of text can be defined by a vertical chain of nodes. In one embodiment, the zoning server device 108 can refine the vertical chain of nodes identified in step 2300 at step 2700 in order to identify the zones of text.

Turning now to step 2200, the zoning server device 108 can apply one or more image pre-processing techniques to the digital document 104. The image pre-processing techniques can include de-skewing images (e.g., images of text) in the digital document 104. In one embodiment, the images can be de-skewed using connected component analysis and labeling. The zoning server device 108 can identify connected regions in an image and can label the connected regions. The connected regions can be, for example, regions surrounding text objects. The zoning server device 108 can identify skew based on an analysis of the connected regions and can de-skew the text so that it is aligned along a vertical and/or horizontal axis. In one embodiment, the zoning server device 108 can remove vertical and/or horizontal dashed line segments. In one embodiment, the zoning server device 108 can detect and separate vertically merged text objects. For example, certain letters within a line can extend past a baseline and can overlap with letters in preceding or succeeding lines to form a merged text object that spans across more than one line. In one embodiment, the zoning server device 108 can analyze a horizontal projection of a text object and determine the height of a text object and can estimate whether the text object is a merged text object based on the height. The zoning server device 108 can separate the merged text objects and assign each text object to a single line.

In one embodiment, the zoning server device 108 can transmit the digital document 104 to an image pre-processing device (e.g., a server). The image pre-processing device can apply the one or more image pre-processing techniques to the digital document 104 and can transmit the modified digital document 104 back to the zoning server device 108.

Turning now to step 2300, the zoning server device 108 can identify one or more vertical chains of nodes based on the digital document 104. In one embodiment, a vertical chain of nodes can be a left-side vertical chain. Each node in the left-side vertical chain can be the first (e.g., leftmost) text object of each line. Text in a digital document 104 is typically left-aligned. Therefore, a left-side vertical chain can accurately form or define the left-hand boundary of a zone of text objects (e.g., one or more paragraphs). In one embodiment, a vertical chain of nodes can be identified based on a number of criteria. The criteria can include, for example, a fitting of the vertical chain to a modeling equation, horizontal spacing between nodes in the vertical chain and left-adjacent text objects, minimum and/or maximum lengths of the vertical chain, and uniformity of lines in the vertical chain.

In one embodiment, the zoning server device 108 can fit the positions of one or more nodes in a potential vertical chain of nodes to a modeling equation. The position of each node can be, for example, a position in a coordinate system defined by the lines of text in the digital document 104. The modeling equation can be a linear equation. The zoning server device 108 can fit the positions to the linear equation using a curve fitting algorithm. In one embodiment, the curve fitting algorithm can prioritize maximizing the number of nodes that are included in the line defined by the linear equation. In one embodiment, the zoning server device 108 can iteratively applying the curve fitting algorithm to the nodes until a linear equation that can be fitted to a stable number of nodes is obtained. In one embodiment, a vertical chain of nodes can be identified as a sequence of nodes wherein a majority of the nodes are included in the line defined by the linear equation. If the sequence of nodes does not satisfy the linear equation, the sequence can be rejected or reconstructed (e.g., lengthened or shortened) to qualify as a vertical chain. In one embodiment, the sequence can be reconstructed based on the variance between the position of the nodes and the linear equation used to identify a vertical chain. The zoning server device 108 can account for the presence of noise in the digital document 104 in determining the position and fitting of the nodes.

In one embodiment, a vertical chain of nodes can span one or more paragraphs of text. A first line in a paragraph of text can be indented relative to the remaining lines of the paragraph. Therefore, the left-side node of the first line in a paragraph will not be in line with the left-side nodes of the remaining lines. A left-side vertical chain of nodes can include indented nodes when the majority of the nodes are still included in a line defined by a linear equation.

Figure 3A:
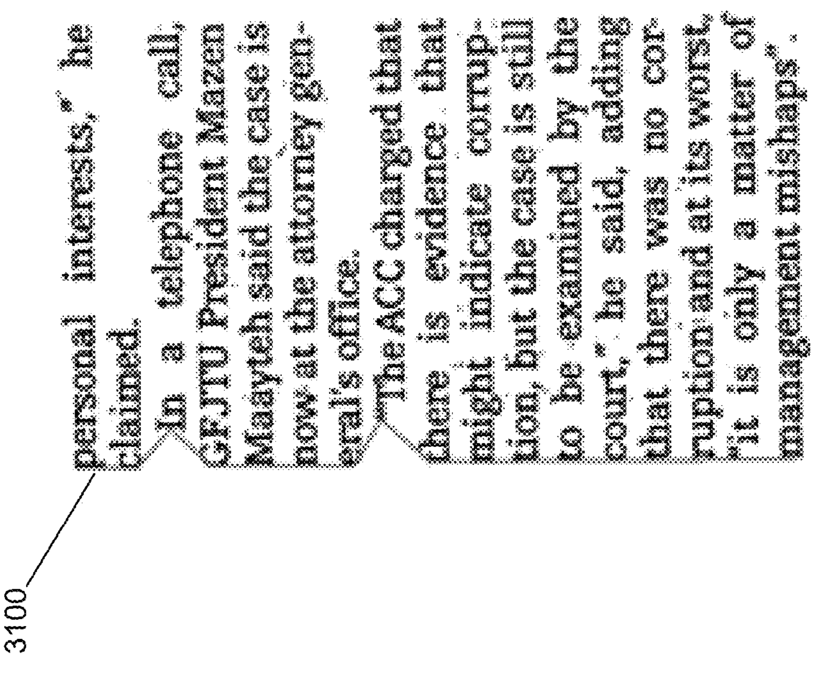
FIG. 3A illustrates a left-side vertical chain of nodes, according to an embodiment of the present disclosure.

FIG. 3A is an illustration of a left-side vertical chain of nodes 3100 spanning more than one paragraphs of text. The nodes of the vertical chain 3100 are the first letter of each line (e.g., "p," "c," "I," etc.). The vertical chain 3100 includes two indented nodes. The remaining nodes in the vertical chain 3100 share a vertical alignment that can be modeled by a linear equation.

In one embodiment, a left-side vertical chain of nodes can be formed by left-side nodes in a first column of text, wherein the first column of text can be adjacent to a second column of text to the left of the first column of text. The left-side nodes of the first column can be the first text object of each line in the first column. The first text object of a line in the first column can be acceptable as the "leftmost" text object when there is a horizontal spacing meeting a minimum width between the first text object and a closest adjacent text object (neighbor) to the left of the first text object. For example, the horizontal spacing between the first text object and a closest left-side neighbor must be equal to or greater than a predetermined minimum width. In one example, the predetermined minimum width can correspond to a width of a column break. In one example, the predetermined minimum width can be greater than the height of a text object. The horizontal spacing meeting the minimum width can indicate that the closest neighbor is not part of the first column. The zoning server device 108 can account for the presence of noise in the lines of text in determining the horizontal spacing between text objects.

FIG. 3B is an illustration of a first column 3200 and an adjacent second column 3300. The first column 3200 can include a number of nodes (e.g., "p," "c," "I," etc.) that can form a vertical chain. Each of the nodes in the first column 3200 can be identified as left-side nodes when a spacing 3250 between each node and a closest neighbor in the second column 3300 exceeds a predetermined minimum width.

In one embodiment, the one or more vertical chains can include a right-side vertical chain, wherein the nodes in the right-side vertical chain can be the last text object of each line. In one embodiment, the right-side vertical chain can be identified based on a corresponding left-side vertical chain. For example, a left-side vertical chain of a first column can be adjacent to or within a maximum horizontal distance of a right-side vertical chain of a second column, the second column being on the left side of the first column.

Turning to step 2300, the zoning server device 108 can classify horizontal spacing (distances) between text objects by extracting each text object in a digital document and identifying the horizontal spaces between each text object and adjacent text objects (neighbors). The zoning server device 108 can assign classifications to horizontal spaces of varying widths based on the range of horizontal spaces that are identified. In general, dimensions (width, height) of spaces and of text objects, as referenced herein, can be quantified in pixels or in any known units of measurements.

For each text object, the zoning server device 108 can identify at least one adjacent (neighboring) text object located a first horizontal distance away from the text object, at least one adjacent (neighboring) text object located a second horizontal distance away from the text object, and at least one adjacent (neighboring) text object located a third horizontal distance away from the text object. The second horizontal distance can be greater than the first horizontal distance. The third horizontal distance can be greater than the second horizontal distance. In one embodiment, each of the first, second, and third horizontal distance can be a non-overlapping or overlapping range of distances. In one embodiment, the zoning server device 108 can identify at least two adjacent text objects for each of the first horizontal distance, the second horizontal distance, and the third horizontal distance. The zoning server device 108 can identify classifications of horizontal distance between adjacent text objects based on the adjacent text objects and first, second, and third horizontal distances identified for each text object.

In one embodiment, the zoning server 108 can identify two adjacent text objects for each horizontal distance, resulting in eight identified adjacent text objects. In one embodiment, the identified adjacent text objects can have similar or comparable size to the text object. In one embodiment, the adjacent text objects can be identified without regard to the location of the adjacent text objects relative to the text object. In this manner, adjacent text objects can be identified to accommodate vertically oriented paragraphs. Each text objects can be paired with identified adjacent text objects according to the classifications of horizontal distance.

In one embodiment, the classifications of horizontal distance can include a high likelihood classification, a medium likelihood classification, and a low likelihood classification. The classifications can correspond to the likelihood that an adjacent text object is in the same segmented line. For example, the high likelihood classification can be assigned to horizontal distances that are smaller than a certain threshold. Adjacent text objects having a high likelihood horizontal spacing therebetween are likely to belong to the same segmented line. For example, the adjacent text objects can be letters within the same word. In one example, the medium likelihood classification can be assigned to horizontal distances that are larger than the high likelihood distance and less than or equal to two times of the high likelihood distance. In one example, adjacent text objects having a medium likelihood horizontal spacing therebetween can be letters in different words. The low likelihood classification can be assigned to horizontal distances that are larger than two times the high likelihood distance. In one example, adjacent text objects having a low likelihood horizontal spacing therebetween can be letters in different columns. The zoning server device 108 can classify each horizontal spacing in the digital document 104 as being a high likelihood distance, medium likelihood distance, or low likelihood distance.

Figure 4:
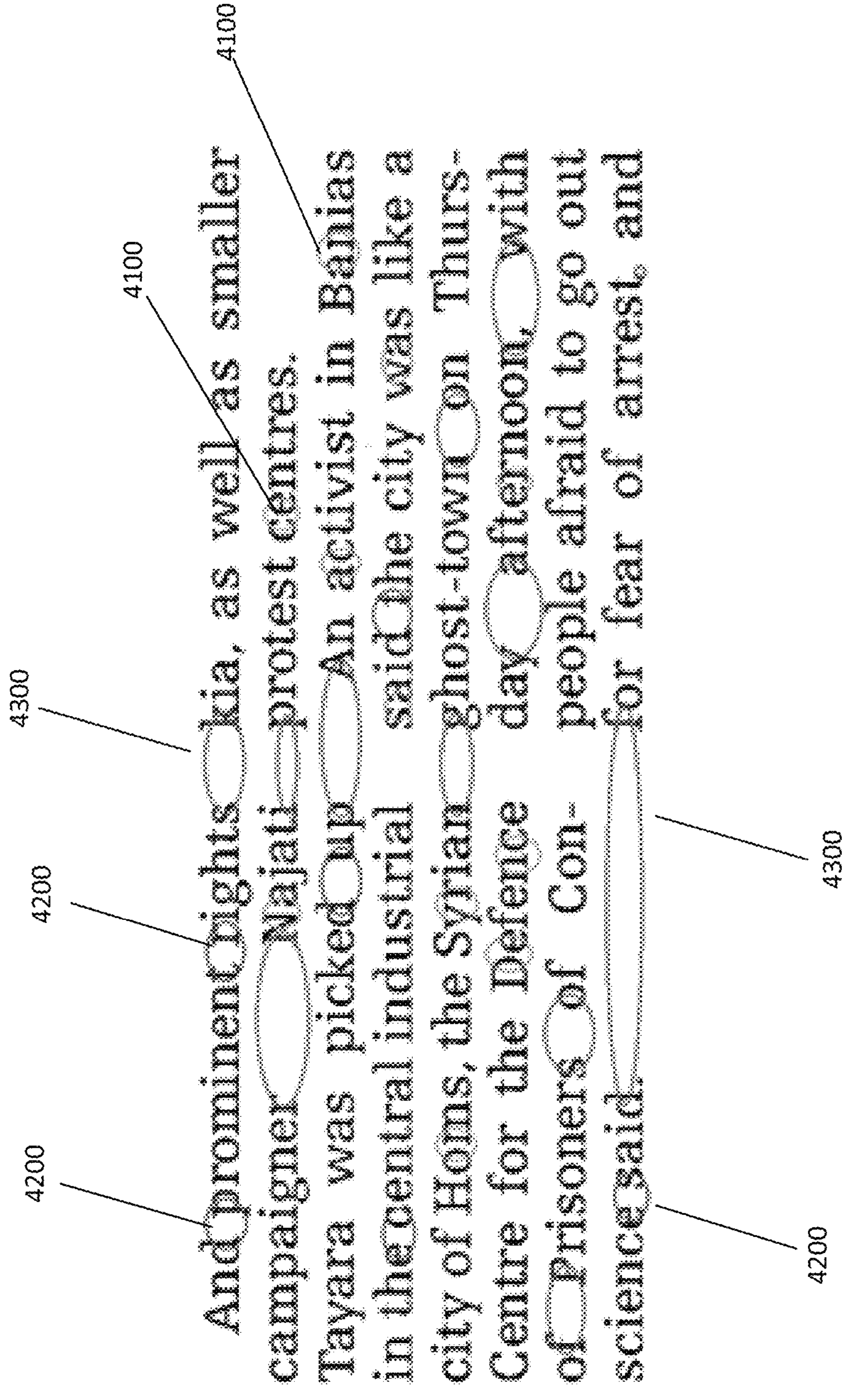
FIG. 4 illustrates horizontal spacing between text objects, according to an embodiment of the present disclosure.

FIG. 4 is an illustrative example of a digital document 104, the digital document 104 including two columns of text. The digital document 104 can include horizontal spacings of high likelihood, medium likelihood, and low likelihood. For example, the horizontal spacings 4100 can be classified as a high likelihood spacing. The horizontal spacings 4200 can be classified as a medium likelihood spacing. The horizontal spacings 4300 can be classified as a low likelihood spacing. According to FIG. 4, a low likelihood spacing 4300 can correspond to spaces between columns as well as spaces between words within a column having a certain text formatting. Therefore, it can be helpful to use additional criteria, such as a vertical chain of nodes, to determine whether adjacent text objects having low likelihood spacing 4300 are in the same segmented line.

Turning now to step 2500, the zoning server device 108 can segment lines of text objects based on the classification of horizontal spacings and the vertical chains of nodes. In one embodiment, the zoning server device 108 can group adjacent text objects having a high likelihood horizontal spacing therebetween as being part of the same segmented line of text objects. The zoning server device 108 can group adjacent text objects having a medium likelihood horizontal spacing therebetween as being part of the same segmented line of text objects based on a vertical chain of nodes. Given a sequence of two or more adjacent text objects having a medium likelihood horizontal spacing therebetween, the rightmost text object in the sequence may or may not be a node in a left-side vertical chain of nodes. When the rightmost text object is a node of a left-side vertical chain of nodes, the zoning server device 108 does not group the text objects as being part of the same segmented line. The rightmost text object being a node of a left-side vertical chain can indicate that the rightmost text object is the first (leftmost) text object in a new column. Therefore, the rightmost text object is separated from the adjacent text objects by a column break and is not part of the same segmented line. When the rightmost text object is not a node of a left-side vertical chain of nodes, the zoning server device 108 can group the text objects as being part of the same segmented line. In one embodiment, the zoning server device 108 may not group adjacent text objects having a low likelihood horizontal spacing therebetween. These text objects can be addressed when the zoning server device 108 refines the segmented lines in step 2600.

Turning now to step 2600, the zoning server device 108 can refine the segmented lines based on surrounding lines. A line of text objects can include a plurality of segmented lines. The refinement of the segmented lines can include determining whether any of the plurality of segmented line should be combined. A segmented line, in this case, can include any groupings of text objects, including single text objects. In one embodiment, the zoning server device 108 can identify at least one upper line above a line of interest and at least one lower line below a line of interest. The line of interest can include one or more segmented lines identified during step 2500. In one embodiment, the zoning server device 108 can identify the upper lines and the lower lines based on a minimum and maximum vertical separation between adjacent lines. In one embodiment, the zoning server device 108 can identify skew lines in the digital document 104 and can identify the upper and lower lines based on the skew lines. In one embodiment, the zoning server device 108 can identify overlapping or merged text objects and can identify the upper and lower lines based on overlapping or merged text objects. The zoning server device 108 can identify the upper and lower lines when there is noise present in the digital document 104.

In one embodiment, the zoning server device 108 can refine the segmented lines by identifying intermediate left-side vertical chains of nodes, the nodes being text objects in a segmented line rather than in a line. For each segmented line within a line of interest, the zoning server device 108 can identify the first (leftmost) text object of the segmented line as a node for a potential intermediate vertical chain of nodes. The zoning server device 108 can further identify the first (leftmost) text object for each segmented line in the upper lines and in the lower lines as nodes for the potential intermediate vertical chain. The zoning server device 108 can then determine whether the leftmost text object in the segmented line of interest can be combined with nodes in the upper line and/or the lower line to form the intermediate vertical chain of nodes, the intermediate vertical chain of nodes being within a line rather than at a left border. The zoning server device 108 can identify the intermediate vertical chain of nodes within the line of interest based on the criteria described herein with reference to step 2300. In one embodiment, the leftmost segmented line within a line can be excluded from being identified in an intermediate vertical chain because the leftmost segmented line is already part of the left-side vertical chains identified in step 2200.

In one embodiment, the zoning server device 108 can combine a segmented line of interest with an adjacent segmented line that shares the same upper and/or lower lines based on the intermediate vertical chain of nodes formed by the segmented line of interest. In one embodiment, if the intermediate vertical chain of nodes has four nodes or fewer (e.g., the intermediate vertical chain spans four or fewer lines in the vertical direction), the zoning server device 108 can combine the segmented line with an adjacent segmented line. If the intermediate vertical chain of nodes has greater than seven nodes, (e.g., the intermediate vertical chain spans seven or more adjacent lines in the vertical direction), the zoning server device 108 may not combine adjacent segmented lines. The intermediate vertical chain being too short (e.g., four or fewer adjacent lines) can indicate that the intermediate vertical chain is not sufficient to form a boundary of a zone of text and that adjacent segmented lines can be combined because they are likely within the same zone of text. The intermediate vertical chain being longer than seven lines can indicate that the intermediate vertical chain is a boundary of a zone of text, and the segmented line should not be combined with adjacent segments that may be outside of the boundary. The ranges described herein are presented as non-limiting examples. Threshold values greater than four and seven or less than four and seven are also compatible with the present disclosure.

When the length of the intermediate vertical chain within the line of interest is between four and seven nodes, the zoning server device 108 can characterize the intermediate vertical chain and/or the segmented line of interest to determine whether to combine adjacent segmented lines. In one embodiment, the zoning server device 108 can determine or characterize the uniformity of text object sizes and fonts of the nodes that represent or are part of the intermediate vertical chain. Segmented lines with similar text object sizes are more likely to be part of the same segmented line. In one embodiment, the zoning server device 108 can determine a vertical alignment of text objects in the segmented line of interest with text objects in the upper and lower lines while accounting for skew in the digital document 104. The zoning server device 108 can combine segmented lines based on a vertical alignment of text objects in the intermediate vertical chain. In one embodiment, the zoning server device 108 can determine a horizontal spacing between the intermediate vertical chain and an adjacent text object, e.g., a nearest text object to the left of the intermediate vertical chain. If the horizontal spacing is greater than a set threshold, the zoning server device 108 may not combine the segmented line with the nearest text object to the left of the intermediate vertical chain. If the horizontal spacing is smaller than a set threshold, the zoning server device 108 may combine the segmented line with the nearest text object to the left.

In one embodiment, the zoning server device 108 can scan the digital document 104, moving downwards through each line and left and right across segmented lines to identify the intermediate vertical chains and refine the segmented lines within each line. When the zoning server device 108 reaches the end of the digital document 104, the zoning server device 108 can return to the first line to repeat the scanning of the refinement step 2600. The intermediate vertical chains can be different with each scan of the digital document 104.

In step 2700, the zoning server device 108 can detect the bounds of paragraphs of text in the digital document 104 based on the segmented lines. In one embodiment, the zoning server device 108 can refine the left-side vertical chains of nodes based on the segmented lines. Refining the left-side vertical chains can include combining vertical chains based on a length, alignment, linear equation, etc. In one embodiment, the zoning server device 108 can eliminate weak left-side vertical chains based on a length, alignment, linear equation, etc. In one embodiment, the zoning server device 108 can identify a right-side vertical chain of nodes corresponding to each left-side vertical chain. The right-side vertical chain can be an adjacent vertical chain of nodes to the left of a left-side vertical chain. In one embodiment, the zoning server device 108 can identify zones of text objects as a series of segmented lines that are bounded by a left-side vertical chain and a right-side vertical chain. For example, a zone of text objects can be a column of text that is separated from adjacent columns by a column break.

The grouping of text objects into zones of text can be useful for OCR. Specifically, after the method 2000 has been executed, an OCR algorithm can be applied to each zone of text as identified by the zoning server device 108. Each zone of text can be analyzed independently by the OCR algorithm to determine an accurate baseline for character recognition within the zone. The zone of text can also be an accurate grouping of text that has a linguistic relationship or coherence. For example, when text is arranged in columns, the text is isolated within each column. Text in a line of a first column is not meant to be combined or related to text in a horizontally aligned line of an adjacent second column. The methods described herein can be used to accurately identify zones of text even in cases with variable font, formatting, spacing, alignment, etc. of text objects within a zone and between zones. For example, the use of the vertical chain of nodes and the upper and lower lines of text can be used to resolve uncertainty arising from variable horizontal spacing when text is centered, left- or right-aligned, justified; or when the digital document 104 includes text headers, images, or non-text objects that break up text.

Each of the functions of the described embodiments can be implemented by one or more processing circuits/processing circuitry (may also be referred to as a controller). A processing circuit includes a programmed processor (for example, a CPU 700 of FIG. 5), as a processor includes circuitry. A processing circuit can also include devices such as an application specific integrated circuit (ASIC) and circuit components arranged to perform the recited functions. The processing circuit can be a part of the zoning server device 108 as discussed in more detail with respect to FIG. 5.

Figure 5:
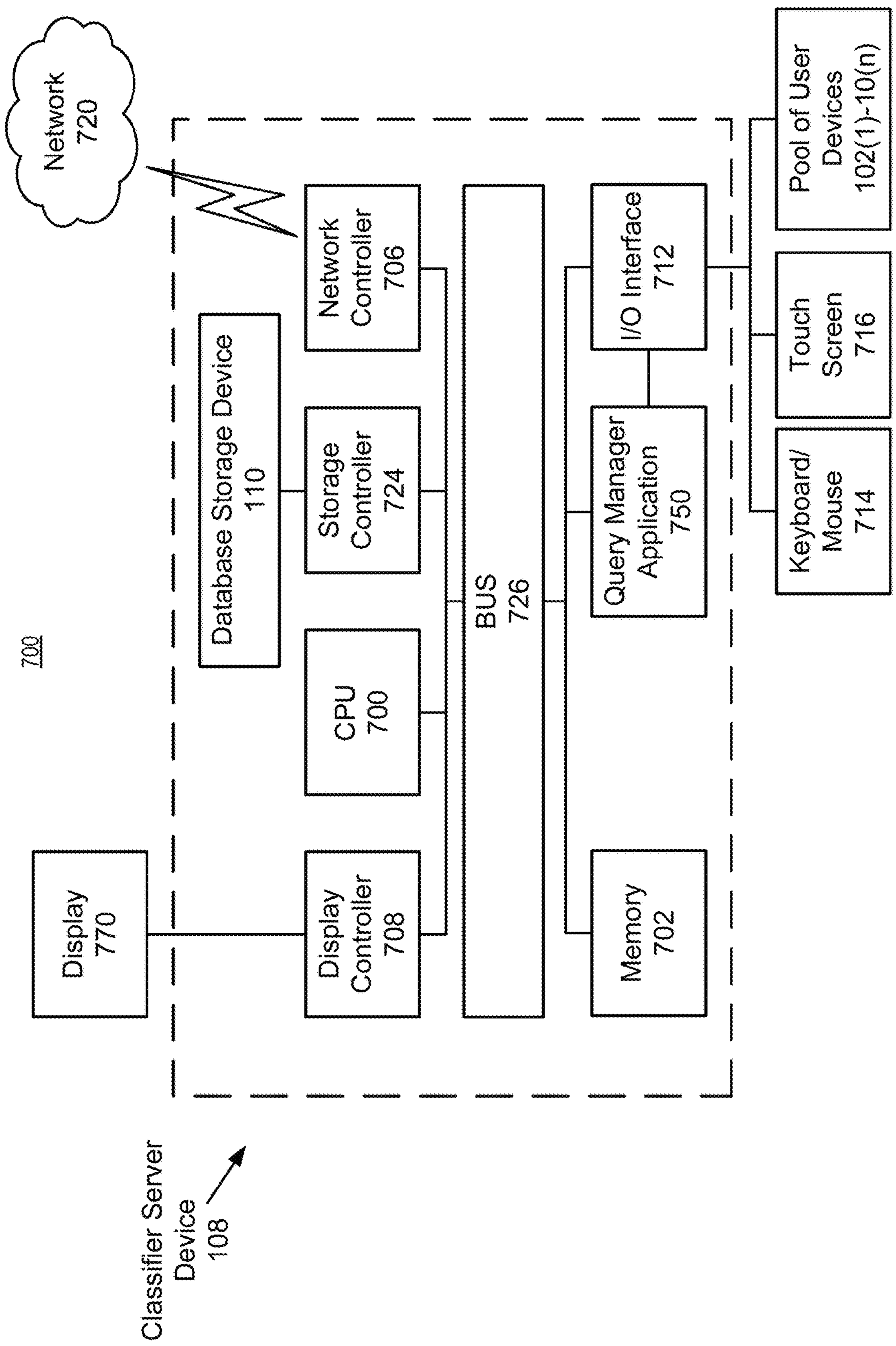
FIG. 5 is a detailed block diagram illustrating an exemplary computing device according to certain embodiments of the present disclosure.

FIG. 5 is a detailed block diagram illustrating an exemplary zoning server device 108 according to certain embodiments of the present disclosure. In FIG. 5, the zoning server device 108 includes a CPU 700, and a query manager application 750. In an embodiment, the zoning server device 108 includes the database storage device 110 to be coupled to storage controller 724. In an embodiment, the database storage device 110 can be a separate individual (external) device and accessed by zoning server device 108 via network 720 (network 106 of FIG. 1).

The CPU 700 performs the processes described in the present disclosure. The process data and instructions can be stored in a memory 702. These processes and instructions (discussed with respect to FIG. 2 through FIG. 4) can also be stored on a storage medium disk 704 such as a hard drive (HDD) or portable storage medium or can be stored remotely.

Further, the discussed features of the present disclosure can be provided as a utility application, background daemon, or component of an operating system, or combination thereof, executing in conjunction with CPU 700 and an operating system such as Microsoft Windows or other versions, UNIX, Solaris, LINUX, Apple MAC-OS and other systems known to those skilled in the art.

The hardware elements in order to achieve the operations of zoning server device 108 can be realized by various circuitry elements, known to those skilled in the art. For example, CPU 700 can be a Xenon or Core processor from Intel of America or an Opteron processor from AMD of America, or can be other processor types that would be recognized by one of ordinary skill in the art.

The zoning server device 108 in FIG. 5 also includes the network controller 706, such as an Intel Ethernet PRO network interface card from Intel Corporation of America, for interfacing with a network 720. As can be appreciated, the network 720 can be a public network, such as the Internet, or a private network such as an LAN or WAN network, or any combination thereof and can also include PSTN or ISDN sub-networks. Network 720 can also be wired, such as an Ethernet network, or can be wireless such as a cellular network including EDGE, 3G and 4G wireless cellular systems. The wireless network can also be WiFi, Bluetooth, or any other wireless form of communication that is known. Zoning server device 108 can communicate with external devices such as database storage device 110, the pool of user devices 102(1)-102(*n*), etc. via the network 720.

The zoning server device 108 further includes a display controller 708, such as a NVIDIA Geforce GTX or Quadro graphics adaptor from NVIDIA Corporation of America for interfacing with display 770. An I/O interface 712 interfaces with a keyboard 714 and/or mouse as well as a touch screen panel 716 and/or separate from display 770. Further, the zoning server device 108 can be connected to the pool of user devices 102(1)-102(*n*) via I/O interface 712 or through the network 720. Pool of user devices 102(1)-102(*n*) can send requests as queries that are handled by the query manager application 750 including extracting data from the database storage device 110 via the storage controller 724, from the memory 702, or trigger execution of processes discussed herein.

The storage controller 724 connects the storage mediums with communication bus 726, which can be an ISA, EISA, VESA, PCI, or similar, for interconnecting all of the components of the zoning server device 108. A description of the general features and functionality of the display 770, keyboard and/or mouse 714, as well as the display controller 708, storage controller 724, network controller 706, and the I/O interface 712 is omitted herein for brevity as these features are known.

In one embodiment, zoning server device 108 of FIG. 5 can send a digital document 104 or receive a digital document 104, via the network 720, to/from pool of user devices 102(1)-102(*n*). Zoning server device 108 upon receiving the digital document 104 as part of a request to initiate a character recognition process stores the received digital document 104 in its memory 702. For example, pool of user devices 102(1)-102(*n*) can send, via the network 720, a modified version of the digital document 104 from the zoning server device 108 or the pool of user devices 102(1)-102(*n*) can receive, via the network 720, a selectable version of the modified document from the zoning server device 108 or a camera 809 of pool of user devices 102(1)-102(*n*) can capture an image of a physical document and transmit the image to the zoning server device 108. Pool of user devices 102(1)-102(*n*) can also perform one or more functions of zoning server device 108 on the hardware of one of the pool of user devices 102(1)-102(*n*), by way of example, user device 102(1), further illustrated in FIG. 6.

Figure 6:
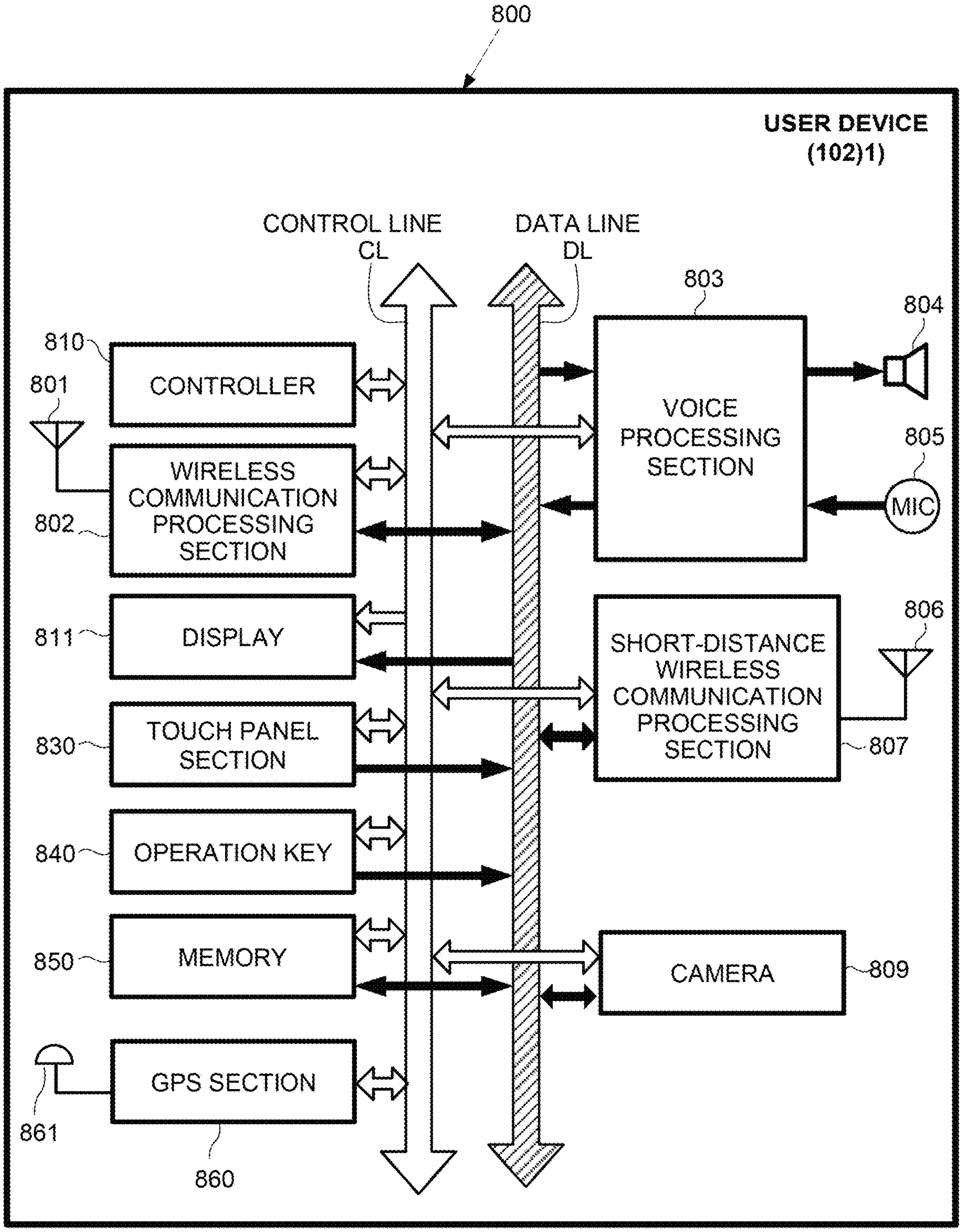
FIG. 6 is a detailed block diagram illustrating an exemplary user device according to certain embodiments of the present disclosure.

FIG. 6 is a detailed block diagram 800 illustrating an exemplary user device from the pool of user devices 102(1)-102(*n*), by way of example, FIG. 6 illustrates user device 102(1) according to certain embodiments of the present disclosure. In certain embodiments, the user device 102(1) can be a smartphone. However, the skilled artisan will appreciate that the features described herein can be adapted to be implemented on other devices (e.g., a laptop, a tablet, a server, an e-reader, a camera, a navigation device, etc.). The exemplary user device 102(1) includes a controller 810 and a wireless communication processing circuitry 802 connected to an antenna 801. A speaker 804 and a microphone 805 are connected to a voice processing circuitry 803.

The controller 810 can include one or more Central Processing Units (CPUs), and can control each element in the user device 102(1) to perform functions related to communication control, audio signal processing, control for the audio signal processing, still and moving image processing and control, and other kinds of signal processing. The controller 810 can perform these functions by executing instructions stored in a memory 850. For example, the processes described herein can be stored in the memory 850. Alternatively or in addition to the local storage of the memory 850, the functions can be executed using instructions stored on an external device accessed on a network or on a non-transitory computer readable medium.

The user device 102(1) includes a control line CL and data line DL as internal communication bus lines. Control data to/from the controller 810 can be transmitted through the control line CL. The data line DL can be used for transmission of voice data, display data, etc.

The antenna 801 transmits/receives electromagnetic wave signals between base stations for performing radio-based communication, such as the various forms of cellular telephone communication. The wireless communication processing circuitry 802 controls the communication performed between the user device 102(1) and other external devices such as the zoning server device 108 via the antenna 801. The wireless communication processing circuitry 802 can control communication between base stations for cellular phone communication.

The speaker 804 emits an audio signal corresponding to audio data supplied from the voice processing circuitry 803. The microphone 805 detects surrounding audio and converts the detected audio into an audio signal. The audio signal can then be output to the voice processing circuitry 803 for further processing. The voice processing circuitry 803 demodulates and/or decodes the audio data read from the memory 850 or audio data received by the wireless communication processing circuitry 802 and/or a short-distance wireless communication processing circuitry 807. Additionally, the voice processing circuitry 803 can decode audio signals obtained by the microphone 805.

The exemplary user device 102(1) can also include a display 811, a touch panel 830, an operation key 840, and a short-distance communication processing circuitry 807 connected to an antenna 806. The display 811 can be a Liquid Crystal Display (LCD), an organic electroluminescence display panel, or another display screen technology.

The touch panel 830 can include a physical touch panel display screen and a touch panel driver. The touch panel 830 can include one or more touch sensors for detecting an input operation on an operation surface of the touch panel display screen.

For simplicity, the present disclosure assumes the touch panel 830 is a capacitance-type touch panel technology. However, it should be appreciated that aspects of the present disclosure can easily be applied to other touch panel types (e.g., resistance-type touch panels) with alternate structures. In certain aspects of the present disclosure, the touch panel 830 can include transparent electrode touch sensors arranged in the X-Y direction on the surface of transparent sensor glass.

The operation key 840 can include one or more buttons or similar external control elements, which can generate an operation signal based on a detected input by the user. In addition to outputs from the touch panel 830, these operation signals can be supplied to the controller 810 for performing related processing and control. In certain aspects of the present disclosure, the processing and/or functions associated with external buttons and the like can be performed by the controller 810 in response to an input operation on the touch panel 830 display screens rather than the external button, key, etc. In this way, external buttons on the user device 800 can be eliminated in lieu of performing inputs via touch operations, thereby improving water-tightness.

The antenna 806 can transmit/receive electromagnetic wave signals to/from other external apparatuses, and the short-distance wireless communication processing circuitry 807 can control the wireless communication performed between the other external apparatuses. Bluetooth, IEEE 802.11, and near-field communication (NFC) are non-limiting examples of wireless communication protocols that can be used for inter-device communication via the short-distance wireless communication processing circuitry 807.

The user device 102(1) can include camera 809, which includes a lens and shutter for capturing photographs of the surroundings around the user device 102(1). In an embodiment, the camera 809 captures surroundings of an opposite side of the user device 102(1) from the user. The images of the captured photographs can be displayed on the display panel 811. Memory circuitry saves the captured photographs. The memory circuitry can reside within the camera 809 or it can be part of the memory 850. The camera 809 can be a separate feature attached to the user device 102(1) or it can be a built-in camera feature.

User device 102(1) can include an application that requests data processing from the zoning server device 108 via the network 720.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein can be used independently of one another, or can be combined in various ways. All possible combinations and sub-combinations are intended to fall within the scope of this disclosure.

While certain embodiments have been described, these embodiments have been presented by way of example only, and are not intended to limit the scope of the present disclosures.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Indeed, the methods, apparatuses and systems described herein can be embodied in a variety of other forms; furthermore, various omissions, substitutions and changes in the form of the methods, apparatuses and systems described herein can be made without departing from the spirit of the present disclosure. The accompanying claims and their equivalents are intended to cover such forms or modifications as would fall within the scope and spirit of the present disclosure. For example, this technology can be structured for cloud computing whereby a single function is shared and processed in collaboration among a plurality of apparatuses via a network.

The methods, apparatuses, and devices discussed herein are examples. Various embodiments can omit, substitute, or add various procedures or components as appropriate. For instance, features described with respect to certain embodiments can be combined in various other embodiments. Different aspects and elements of the embodiments can be combined in a similar manner. The various components of the figures provided herein can be embodied in hardware and/or software. Also, technology evolves and, thus, many of the elements are examples that do not limit the scope of the disclosure to those specific examples.

Obviously, numerous modifications and variations are possible in light of the above teachings. It is therefore to be understood that within the scope of the appended claims, the present disclosure can be practiced otherwise than as specifically described herein.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Embodiments of the present disclosure may also be set forth in the following parentheticals.

(1) A method for identifying zones of text in a digital document, comprising: identifying, via processing circuitry, one or more vertical chains of nodes in the digital document, each node of each vertical chain corresponding to a leftmost text object of a horizontal line of text in the digital document; classifying, via the processing circuitry, horizontal spaces between horizontally aligned text objects in the digital document; combining, via the processing circuitry, one or more text objects into a segmented horizontal line based on the one or more vertical chains and the classification of horizontal spaces between the one or more text objects; identifying, via the processing circuitry, one or more intermediate vertical chains of nodes in the digital document, each node of each intermediate vertical chain corresponding to a text object of a segmented horizontal line; refining, via the processing circuitry, the segmented horizontal line based on the one or more intermediate vertical chains; and identifying, via the processing circuitry, a zone of text based on the one or more vertical chains of nodes and the segmented horizontal line.

(2) The method of (1), further comprising fitting a position of one or more nodes in a vertical chain of nodes to a linear equation.

(3) The method of (1) to (2), wherein the fitting the position of the one or more nodes includes fitting the position of a majority of nodes in the vertical chain of nodes to the linear equation.

(4) The method of (1) to (3), wherein the classifying the horizontal spaces includes classifying a horizontal space between a node of a vertical chain and an adjacent text object to the right of the node when the horizontal space is greater than a predetermined minimum width.

(5) The method of (1) to (4), wherein the classifying the horizontal spaces includes classifying a horizontal space based on an absolute or relative width of the horizontal space.

(6) The method of (1) to (5), wherein the refining the segmented horizontal line includes adding or removing text objects to or from the segmented horizontal line.

(7) The method of (1) to (6), wherein each node in an intermediate vertical chain of nodes is a leftmost text object of the segmented horizontal line.

(8) A device comprising processing circuitry configured to identify one or more vertical chains of nodes in a digital document, each node of each vertical chain corresponding to a leftmost text object of a horizontal line of text in the digital document, classify horizontal spaces between horizontally aligned text objects in the digital document, combine one or more text objects into a segmented horizontal line based on the one or more vertical chains and the classification of horizontal spaces between the one or more text objects, identify one or more intermediate vertical chains of nodes in the digital document, each node of each intermediate vertical chain corresponding to a text object of a segmented horizontal line, refine the segmented horizontal line based on the one or more intermediate vertical chains, and identify a zone of text based on the one or more vertical chains of nodes and the segmented horizontal line.

(9) The device of (8), wherein the processing circuitry is further configured to fit a position of one or more nodes in a vertical chain of nodes to a linear equation.

(10) The device of (8) to (9), wherein the processing circuitry is further configured to fit the position of a majority of nodes in the vertical chain of nodes to the linear equation.

(11) The device of (8) to (10), wherein the processing circuitry is configured to classify a horizontal space between a node of a vertical chain and an adjacent text object to the right of the node when the horizontal space is greater than a predetermined minimum width.

(12) The device of (8) to (11), wherein the processing circuitry is configured to classify a horizontal space based on an absolute or relative width of the horizontal space.

(13) The device of (8) to (12), wherein the processing circuitry is configured to refine the segmented horizontal line by adding or removing text objects to or from the segmented horizontal line.

(14) The device of (8) to (13), wherein each node in an intermediate vertical chain of nodes is a leftmost text object of the segmented horizontal line.

(15) A non-transitory computer-readable storage medium for storing computer-readable instructions that, when executed by a computer, cause the computer to perform a method, the method comprising identifying one or more vertical chains of nodes in a digital document, each node of each vertical chain corresponding to a leftmost text object of a horizontal line of text in the digital document; classifying horizontal spaces between horizontally aligned text objects in the digital document; combining one or more text objects into a segmented horizontal line based on the one or more vertical chains and the classification of horizontal spaces between the one or more text objects; identifying one or more intermediate vertical chains of nodes in the digital document, each node of each intermediate vertical chain corresponding to a text object of a segmented horizontal line; refining the segmented horizontal line based on the one or more intermediate vertical chains; and identifying a zone of text based on the one or more vertical chains of nodes and the segmented horizontal line.

(16) The non-transitory computer-readable storage medium of (15), wherein the method further comprises fitting a position of one or more nodes in a vertical chain of nodes to a linear equation.

(17) The non-transitory computer-readable storage medium of (15) to (16) wherein the fitting the position of the one or more nodes includes fitting the position of a majority of nodes in the vertical chain of nodes to the linear equation.

(18) The non-transitory computer-readable storage medium of (15) to (17), wherein the classifying the horizontal spaces includes classifying a horizontal space between a node of a vertical chain and an adjacent text object to the right of the node when the horizontal space is greater than a predetermined minimum width.

(19) The non-transitory computer-readable storage medium of (15) to (18), wherein the classifying the horizontal spaces includes classifying a horizontal space is based on an absolute or relative width of the horizontal space.

(20) The non-transitory computer-readable storage medium of (15) to (19), wherein each node in an intermediate vertical chain of nodes is a leftmost text object of the segmented horizontal line.

Thus, the foregoing discussion discloses and describes merely exemplary embodiments of the present disclosure. As will be understood by those skilled in the art, the present disclosure can be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for identifying zones of text in a digital document, comprising:

identifying, via processing circuitry, one or more vertical chains of nodes in the digital document, each node of each vertical chain corresponding to a leftmost text object of a horizontal line of text in the digital document;

classifying, via the processing circuitry, horizontal spaces between horizontally aligned text objects in the digital document;

combining, via the processing circuitry, one or more text objects into a segmented horizontal line based on the one or more vertical chains and the classification of horizontal spaces between the one or more text objects;

identifying, via the processing circuitry, one or more intermediate vertical chains of nodes in the digital document, each node of each intermediate vertical chain corresponding to a text object of a segmented horizontal line;

refining, via the processing circuitry, the segmented horizontal line based on the one or more intermediate vertical chains; and identifying, via the processing circuitry, a zone of text based on the one or more vertical chains of nodes and the segmented horizontal line.

2. The method of claim 1, further comprising fitting a position of one or more nodes in a vertical chain of nodes to a linear equation.

3. The method of claim 2, wherein the fitting the position of the one or more nodes includes fitting the position of a majority of nodes in the vertical chain of nodes to the linear equation.

4. The method of claim 1, wherein the classifying the horizontal spaces includes classifying a horizontal space between a node of a vertical chain and an adjacent text object to the right of the node when the horizontal space is greater than a predetermined minimum width.

5. The method of claim 1, wherein the classifying the horizontal spaces includes classifying a horizontal space based on an absolute or relative width of the horizontal space.

6. The method of claim 1, wherein the refining the segmented horizontal line includes adding or removing text objects to or from the segmented horizontal line.

7. The method of claim 1, wherein each node in an intermediate vertical chain of nodes is a leftmost text object of the segmented horizontal line.

8. A device comprising:

processing circuitry configured to identify one or more vertical chains of nodes in a digital document, each node of each vertical chain corresponding to a leftmost text object of a horizontal line of text in the digital document, classify horizontal spaces between horizontally aligned text objects in the digital document, combine one or more text objects into a segmented horizontal line based on the one or more vertical chains and the classification of horizontal spaces between the one or more text objects, identify one or more intermediate vertical chains of nodes in the digital document, each node of each intermediate vertical chain corresponding to a text object of a segmented horizontal line, refine the segmented horizontal line based on the one or more intermediate vertical chains, and identify a zone of text based on the one or more vertical chains of nodes and the segmented horizontal line.

9. The device of claim 8, wherein the processing circuitry is further configured to fit a position of one or more nodes in a vertical chain of nodes to a linear equation.

10. The device of claim 9, wherein the processing circuitry is further configured to fit the position of a majority of nodes in the vertical chain of nodes to the linear equation.

11. The device of claim 8, wherein the processing circuitry is configured to classify a horizontal space between a node of a vertical chain and an adjacent text object to the right of the node when the horizontal space is greater than a predetermined minimum width.

12. The device of claim 8, wherein the processing circuitry is configured to classify a horizontal space based on an absolute or relative width of the horizontal space.

13. The device of claim 8, wherein the processing circuitry is configured to refine the segmented horizontal line by adding or removing text objects to or from the segmented horizontal line.

14. The device of claim 8, wherein each node in an intermediate vertical chain of nodes is a leftmost text object of the segmented horizontal line.

15. A non-transitory computer-readable storage medium for storing computer-readable instructions that, when executed by a computer, cause the computer to perform a method, the method comprising:

identifying one or more vertical chains of nodes in a digital document, each node of each vertical chain corresponding to a leftmost text object of a horizontal line of text in the digital document;

classifying horizontal spaces between horizontally aligned text objects in the digital document;

combining one or more text objects into a segmented horizontal line based on the one or more vertical chains and the classification of horizontal spaces between the one or more text objects;

identifying one or more intermediate vertical chains of nodes in the digital document, each node of each intermediate vertical chain corresponding to a text object of a segmented horizontal line;

refining the segmented horizontal line based on the one or more intermediate vertical chains; and identifying a zone of text based on the one or more vertical chains of nodes and the segmented horizontal line.

16. The non-transitory computer-readable storage medium of claim 15, wherein the method further comprises fitting a position of one or more nodes in a vertical chain of nodes to a linear equation.

17. The non-transitory computer-readable storage medium of claim 16, wherein the fitting the position of the one or more nodes includes fitting the position of a majority of nodes in the vertical chain of nodes to the linear equation.

18. The non-transitory computer-readable storage medium of claim 15, wherein the classifying the horizontal spaces includes classifying a horizontal space between a node of a vertical chain and an adjacent text object to the right of the node when the horizontal space is greater than a predetermined minimum width.

19. The non-transitory computer-readable storage medium of claim 15, wherein the classifying the horizontal spaces includes classifying a horizontal space is based on an absolute or relative width of the horizontal space.

20. The non-transitory computer-readable storage medium of claim 15, wherein each node in an intermediate vertical chain of nodes is a leftmost text object of the segmented horizontal line.

* * * * *